US012679074B2

(12) United States Patent
Rufino et al.

(10) Patent No.: US 12,679,074 B2
(45) Date of Patent: Jul. 14, 2026

(54) LAMINATED GLAZING WITH ELECTRICALLY CONTROLLABLE OPTICAL PROPERTIES FOR A VEHICLE EQUIPPED WITH A SEMITRANSPARENT REFLECTIVE PRINTED INSCRIPTION ON THE EXTERIOR FACE OF A VEHICLE

(71) Applicant: SAINT-GOBAIN GLASS FRANCE, Courbevoie (FR)

(72) Inventors: Benoit Rufino, Courtieux (FR); Frédéric Berthe, Cambronne-les-Ribecourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 362 days.

(21) Appl. No.: 18/254,762

(22) PCT Filed: Dec. 1, 2021

(86) PCT No.: PCT/FR2021/052171
§ 371 (c)(1),
(2) Date: May 26, 2023

(87) PCT Pub. No.: WO2022/117955
PCT Pub. Date: Jun. 9, 2022

(65) Prior Publication Data
US 2024/0001645 A1 Jan. 4, 2024

(30) Foreign Application Priority Data
Dec. 2, 2020 (FR) ...................................... 2012513

(51) Int. Cl.
| | |
|---|---|
| *B32B 15/04* | (2006.01) |
| *B32B 17/06* | (2006.01) |
| *B32B 17/10* | (2006.01) |

(52) U.S. Cl.
CPC .. *B32B 17/10504* (2013.01); *B32B 17/10036* (2013.01); *B32B 17/10266* (2013.01);
(Continued)

(58) Field of Classification Search
CPC ................................................ B32B 17/10036
(Continued)

(56) References Cited

U.S. PATENT DOCUMENTS

| | | | |
|---|---|---|---|
| 3,951,525 A | | 4/1976 | Ballentine et al. |
| 4,997,687 A | * | 3/1991 | Carter ....................... B44F 1/08 |
| | | | 52/235 |

(Continued)

FOREIGN PATENT DOCUMENTS

| | | |
|---|---|---|
| CN | 1656034 A | 8/2005 |
| DE | 10 2008 026339 A1 | 12/2009 |
| FR | 2 200 221 A1 | 4/1974 |

OTHER PUBLICATIONS

International Search Report as issued in International Patent Application No. PCT/FR2021/052171, dated Mar. 7, 2022.

*Primary Examiner* — Lauren R Colgan
(74) *Attorney, Agent, or Firm* — CUSHMAN PARTNERS, LLC

(57) ABSTRACT

A laminated glazing for a vehicle provided with an inscription includes an interior glass sheet and an exterior glass sheet, each including an inner face and an outer face, and including, between the inner faces of the two glass sheets, an interlayer including at least two outer layers in a material selected from polyvinyl butyral (PVB), polyethylene vinyl acetate (EVA) and polyurethane (PU) and mixtures thereof, the outer layers being joined by a functional element (4) of liquid crystals dispersed in a polymer matrix. The functional element includes a liquid crystal active layer between two electrically conductive layers, themselves disposed between (Continued)

two carrier films. The inscription is a semi-transparent reflective layer and the inscription is printed on the exterior glass sheet on the outer face.

20 Claims, 2 Drawing Sheets

(52) U.S. Cl.
CPC .. *B32B 17/10779* (2013.01); *B32B 17/10807* (2013.01); *B32B 2250/05* (2013.01); *B32B 2250/40* (2013.01); *B32B 2307/202* (2013.01); *B32B 2307/412* (2013.01); *B32B 2307/416* (2013.01); *B32B 2605/006* (2013.01)

(58) Field of Classification Search
USPC ........................................................ 428/428
See application file for complete search history.

(56)                          References Cited

U.S. PATENT DOCUMENTS

| | | | | |
|---|---|---|---|---|
| 5,111,329 | A * | 5/1992 | Gajewski | G02F 1/133305 |
| | | | | 359/260 |
| 5,270,518 | A * | 12/1993 | Naoumenko | B32B 17/10293 |
| | | | | 219/547 |
| 5,322,875 | A * | 6/1994 | Dages | B32B 17/10761 |
| | | | | 524/304 |
| 5,408,353 | A * | 4/1995 | Nichols | G02F 1/13439 |
| | | | | 359/260 |
| 6,432,522 | B1 * | 8/2002 | Friedman | B32B 17/10036 |
| | | | | 428/688 |
| 10,082,716 | B2 * | 9/2018 | Mennig | B32B 17/10788 |
| 10,866,480 | B2 * | 12/2020 | Le Houx | B32B 17/10513 |
| 10,882,780 | B2 * | 1/2021 | Conti | B32B 17/10128 |
| 10,968,684 | B2 * | 4/2021 | Bjergaard | B32B 17/10532 |
| 2001/0046595 | A1 * | 11/2001 | Moran | C09J 7/22 |
| | | | | 428/212 |
| 2002/0061395 | A1 * | 5/2002 | Moran | B32B 17/10761 |
| | | | | 428/483 |
| 2003/0165675 | A1 * | 9/2003 | Marzolin | H01J 61/35 |
| | | | | 428/328 |
| 2003/0224181 | A1 * | 12/2003 | Finley | C03C 17/3634 |
| | | | | 428/432 |
| 2006/0008648 | A1 * | 1/2006 | Bennison | C08K 5/103 |
| | | | | 428/411.1 |
| 2008/0318028 | A1 * | 12/2008 | Winstanley | B32B 17/10761 |
| | | | | 428/332 |
| 2009/0135319 | A1 * | 5/2009 | Veerasamy | B32B 17/10504 |
| | | | | 349/16 |
| 2009/0219468 | A1 * | 9/2009 | Barton | B32B 17/10651 |
| | | | | 359/359 |
| 2009/0279004 | A1 * | 11/2009 | Greenall | B32B 17/10633 |
| | | | | 349/193 |
| 2011/0096555 | A1 * | 4/2011 | Pires | B32B 17/10036 |
| | | | | 428/203 |
| 2016/0325528 | A1 * | 11/2016 | Berard | G02B 6/0033 |
| 2016/0349442 | A1 * | 12/2016 | Berard | B32B 17/10018 |
| 2018/0074251 | A1 * | 3/2018 | Berard | G09F 13/18 |
| 2018/0304590 | A1 * | 10/2018 | Fukatani | C09J 129/14 |
| 2019/0255813 | A1 * | 8/2019 | Bauerle | B60J 1/20 |
| 2019/0263105 | A1 * | 8/2019 | Briquet | B32B 38/145 |
| 2020/0031206 | A1 * | 1/2020 | Sweney | B60J 1/02 |
| 2021/0339609 | A1 * | 11/2021 | Farreyrol | G02B 5/26 |
| 2021/0387513 | A1 * | 12/2021 | Bard | B32B 17/10174 |

* cited by examiner

[Fig.1]
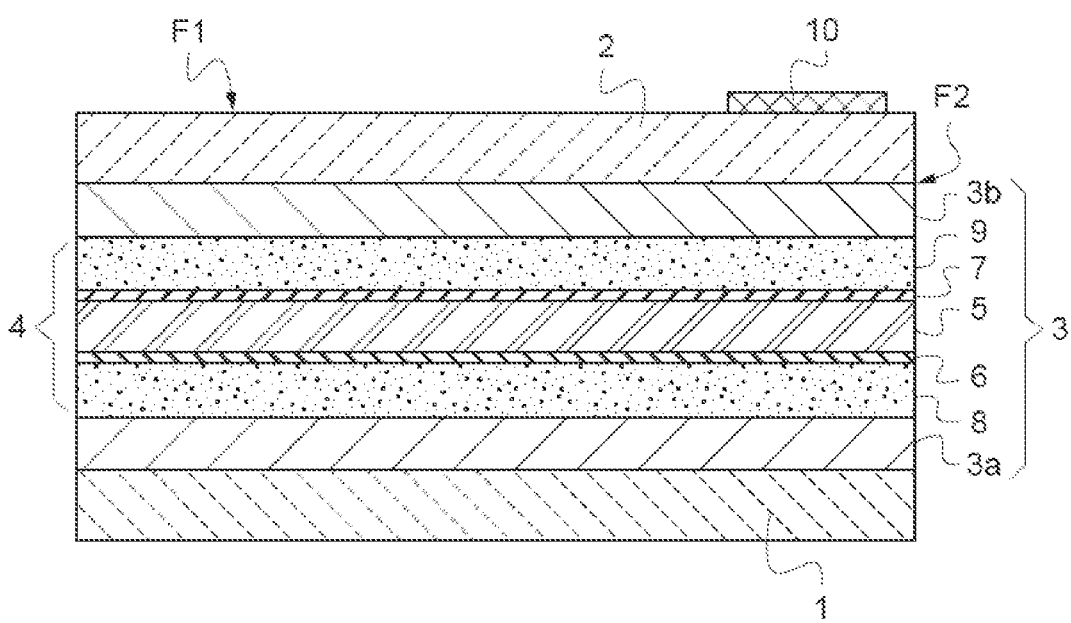

[Fig. 2]
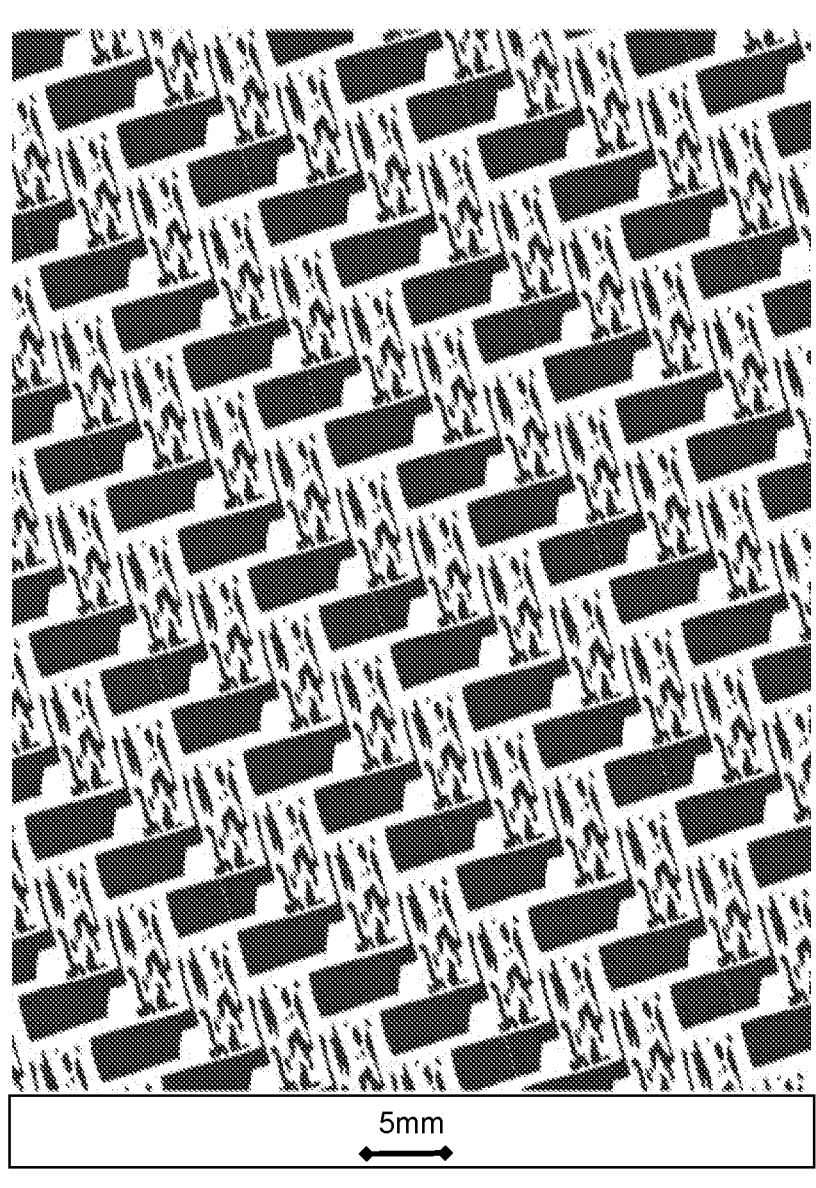
5mm

LAMINATED GLAZING WITH ELECTRICALLY CONTROLLABLE OPTICAL PROPERTIES FOR A VEHICLE EQUIPPED WITH A SEMITRANSPARENT REFLECTIVE PRINTED INSCRIPTION ON THE EXTERIOR FACE OF A VEHICLE

CROSS-REFERENCE TO RELATED APPLICATIONS

This application is the U.S. National Stage of PCT/FR2021/052171, filed Dec. 1, 2021, which in turn claims priority to French patent application number 2012513 filed Dec. 2, 2020. The content of these applications are incorporated herein by reference in their entireties.

The invention relates to a laminated glazing for vehicle with electrically controllable optical properties. The laminated glazing according to the invention comprises a functional element of liquid crystals dispersed in a polymer matrix, also called "PDLC (polymer dispersed liquid crystal) functional element", having electrically controllable optical properties, said glazing being provided with a printed inscription, consisting of a semi-transparent reflective layer, positioned on the outer face of a vehicle.

Laminated glazings are commonly used in the transport sector, especially in windows for cars, ships and aircraft, such as roof windows, as well as in the construction industry. Laminated glazings are generally composed of a first sheet of glass and a second sheet of glass, with an 20 interlayer in between. These glazings are manufactured by a known laminating process, for example by hot and pressurized assembly.

Laminated glazings with electrically controllable optical properties are known per se. Moreover, PDLC functional elements are known, for example, from patent application DE 102008026339 A1. The active layer of these functional elements contains liquid crystals that are embedded in a polymer matrix. When no electrical current is applied, also known as the "OFF state", the liquid crystals are oriented in a disordered manner, resulting in heavy scattering of light through the active layer. The laminated glazing is then translucent. The light transmission of the glazing in the visible range is then low. When an electric current is applied, also called the "ON state", the liquid crystals align in the same direction and the light transmission of the glass in the visible range is increased. The laminated glazing is then transparent, it is then possible to see through the glass.

The PDLC functional element prevents the driver or passengers from seeing into the vehicle from the outside and protects them from glare, thus improving their visual comfort.

In general, a laminated glazing with electrically controllable optical properties of the PDLC type comprises a functional element of liquid crystals dispersed in a polymer matrix located in the core of an interlayer. The functional element is thus arranged between the two outer layers of the interlayer; the two outer layers being made of a thermoplastic material. The functional element is then bonded to a first sheet of glass by one of the two outer layers of the interlayer and to a second sheet of glass by the other outer layer of the interlayer, thus forming said laminated glazing.

The functional element comprises at least one active liquid crystal layer, which is arranged between a first carrier film and a second carrier film. The functional element also includes two electrically conductive layers for applying an electric current to the active layer. The electrically conductive layers are arranged between the carrier films and the active liquid crystal layer. Thus, the functional element comprises, in the order stated, at least one carrier film, an electrically conductive layer, a liquid crystal layer, another electrically conductive layer, and another carrier film.

It is known to decorate or personalize the glazings of vehicle with inscriptions in the form of stickers, or plastic parts to be glued or screwed on, placed on the outer face of the vehicle, so that they are clearly visible from the outside. However, the use of these different types of inscriptions on laminated glazings with PDLC functional elements (such as those described above) have the main disadvantage of eliminating the transparency of this type of glazing, especially when it is in the ON state. In other words, the light transmission in the visible range (called "LT") in the region of the glazing with these forms of inscriptions is equal to zero. In fact, in the area of the glazing provided with these inscriptions, it is no longer possible to see through the window, especially for the driver or passenger from the inside of the vehicle to the outside of the vehicle, since these inscriptions remain opaque whether in the ON or OFF state.

Moreover, such inscriptions can be removed from the glazings on which they are glued or screwed, which can then cause damages to the glazings. Moreover, these inscriptions are not sufficiently resistant to external aggressions such as ultraviolet rays or climatic agents (high humidity, acid rain, bird droppings, etc.), nor to mechanical stresses such as those of vehicle cleaning agents like washing brushes, pressure washers, etc. . . .

The Applicant has thus sought to decorate and/or personalize a laminated glazing comprising a PDLC functional element as described above while preserving the optical properties of this type of glass (i.e., a light transmission greater than zero, including in the ON state in the decorated area); said decoration or said inscription must also be sufficiently resistant to chemical and mechanical alterations.

The inscription specifically chosen by the Applicant to decorate and/or personalize such a laminated glazing is a printed inscription, consisting of a reflective and semi-transparent layer. Furthermore, the Applicant found that this inscription had to be precisely positioned on the glass sheet of the laminated glazing comprising a PDLC located on the outer face of the vehicle, and more particularly on the outer face of said glass sheet (commonly referred to as "face 1" (F1) of the exterior glass sheet)).

The object of the present application is therefore a laminated glazing for a vehicle provided with an inscription comprising an interior glass sheet (1) and an exterior glass sheet (2), each comprising an inner face and an outer face, and comprising, between the inner faces of the two glass sheets, an interlayer (3) comprising at least two outer layers (3a) and (3b) in a material selected from polyvinyl butyral (PVB), polyethylene vinyl acetate (EVA) and polyurethane (PU) and mixtures thereof, said outer layers being joined by means of a functional element (4) of liquid crystals dispersed in a polymer matrix, said functional element (4) comprising a liquid crystal active layer (5) between two electrically conductive layers (6, 7), themselves disposed between two carrier films (8, 9), said glazing being characterized in that the inscription (10) consists of a semi-transparent reflective layer and said inscription is printed on the exterior glass sheet (2) on the outerface (F1).

FIG. 1 is an edge view of a laminated glazing according to one embodiment of the invention.

FIG. 2 shows a printed inscription according to an embodiment of the invention.

The inventors have in fact surprisingly found that the use of an inscription consisting of a semi-transparent reflective layer and printed on the outerface of the exterior glass sheet of a laminated glazing comprising a PDLC functional element, according to the invention, makes it possible to maintain, and even improve, the optical properties of such a glazing, because:

in the ON state, i.e. when an electric current is applied to the laminated glazing, the transparency, i.e. the light transmission "LT" of the glass in the visible range is kept non-zero in the region where the printed inscription is located, the LT is well above 0%, i.e. it is possible to see from the inside of the vehicle to the outside of the vehicle through the printed inscription. Thus, the glass may still be transparent in the printed area, in contrast to a glazing area with stickers, or glued-on or screwed-on plastic parts;

the printed inscription is quite reflective, and therefore visible from the outside, whether the functional element in the laminated glazing is in the OFF or ON state;

the inventors have also noticed that the region of the glazing provided with the layer forming the printed inscription according to the invention, i.e. on the exterior glass sheet (2) on the outer face (face of the glass sheet directed towards the outside of the vehicle commonly called "face 1" (F1)), had an improved level of external light reflection "$LR_{ext}$" in the visible range (light reflected towards the outside environment, towards the outside of the vehicle), compared to that obtained with a decorative element of the sticker type, or glued-on or screwed-on plastic parts, placed on the outer face of the vehicle, or compared to that obtained with a printed inscription made of a reflective, semi-transparent layer placed on the outside glass sheet but located on the inside (face of the glass sheet directed towards the inside of the vehicle, towards the outer layer of the interlayer, commonly called "face 2" (F2)).

Moreover, in a preferred embodiment, the region (or zone) of the glazing provided with the layer forming the printed inscription has, in the wavelength range of the visible spectrum, a light transmission greater than 0% and an external light reflection between 10% and 30%, and preferably a light transmission between 0.5% and 30% and an external light reflection between 13% and 25%.

In general, all the luminous characteristics presented in this description are obtained according to the principles and methods described in the international standard ISO 9050 (2003) and the standard NF EN 410 (2011), referring to the determination of the luminous features of glazings for vehicles.

The printed inscription consisting of a semi-transparent reflective layer placed on the exterior glass sheet on the outer face of said glass sheet, according to the invention, also has the advantage of being intimately bonded to the glass (by strong chemical bonds); it cannot be detached from the glass as a sticker can, for example (cracking, tearing). This printed inscription avoids the vandalism that vehicles with glued-on plastic parts may undergo (e.g. automaker's logo, special series design).

According to the invention, the laminated glazing is composed of a first interior glass sheet (1) and a second exterior glass sheet (2), between which there is an interlayer (3).

According to the invention, "interior glass sheet" means a glass sheet facing the interior of the vehicle. An "exterior glass sheet" in this application means a glass sheet facing the exterior environment.

Each glass sheet has an inner and an outer face. Between the inner surfaces of the two glass sheets (1, 2) is the an interlayer (3).

According to the invention, the "outer face" of the exterior glass sheet (2) is the face of said glass sheet facing the outside of the vehicle, commonly referred to as "face 1" (F1). Moreover, by "inner face" of the exterior glass sheet (2), we mean the face of said glass sheet directed towards the interior of the vehicle, towards the interlayer (3) and more precisely towards the outer layer (3b) commonly called "face 2" (F2).

The interior and exterior glass sheets (1, 2) are preferably made of soda-lime glass, as is usual for windows. However, the glass sheets can also be made of other types of glass, e.g. quartz glass, borosilicate glass or aluminosilicate glass, or of rigid transparent plastics, e.g. polycarbonate or polymethylmethacrylate. The thickness of the interior and exterior glass sheets can be varied considerably and thus adapted to the various requirements. The exterior and/or interior glass sheet has a thickness of preferably between 0.5 mm and 15 mm and preferentially between 1 mm and 5 mm.

According to a preferred embodiment, the interior and/or the exterior 30 glass sheet comprises at least one coating. This (these) coating(s) is (are) intended to give the glass substrate optical properties (mirrored or anti-reflective layers), thermal properties (low-emissive layers, solar control or anti-solar layers) or electrical properties (transparent conductive layers, antistatic layers). The interior glass sheet and/or exterior glass sheet may also include other types of coatings, such as non-stick coatings, scratch-resistant coatings, or photocatalytic coatings.

The interlayer (3) is arranged between the first and second glass sheets, i.e. between the interior glass sheet (1) and the exterior glass sheet (2), as defined above, and more precisely between the inner faces of the two glass sheets (1, 2). The interlayer according to the invention comprises at least two outer layers (3a) and (3b) in a material selected from polyvinyl butyral (PVB), polyethylene vinyl acetate (EVA) and polyurethane (PU) and mixtures thereof, also referred to as "skin layers". Said outer layers (3a, 3b) are joined by means of a functional element (4) of liquid crystals dispersed in a polymer matrix (PDLC), also referred to as the "inner layer" or "core". According to a preferred embodiment, the two outer layers (3a, 3b) are made in the same material, but it is also possible that the two outer layers are made of a different material.

The outer layer (3a) and/or the outer layer (3b) can have a thickness between 0.2 mm and 2.0 mm, preferably between 0.3 mm and 0.9 mm and more preferably between 0.3 mm and 0.5 mm, and for example a thickness of 0.38 mm. The two outer layers (3a) and (3b) are advantageously polyvinyl butyral (PVB) layers. In addition, these two outer layers of PVB can be clear, colored, or have acoustic properties. The outer layer (3a) and/or the outer layer (3b) of PVB may comprise at least one plasticizer. For example, aliphatic tri- or tetraethylene glycol diesters, such as triethylene glycol-bis-(2-ethyl hexanoate), are used as plasticizers. Typical PVB outer layers used in a laminated glazing interlayer have a plasticizer content of at least 15% by weight.

The functional element of liquid crystals dispersed in a polymer matrix (PDLC) (4), according to the invention, comprises a liquid crystal active layer (5) between two electrically conductive layers (6, 7), which are themselves arranged between two carrier films (8, 9). The active layer has controllable optical properties that can be controlled by an electric current applied to the two electrically conductive layers, each of which has an electrode. The electrically conductive layers and the active layer are arranged parallel to the surfaces of the exterior and interior glass sheets. The electrodes are usually electrically connected to an external voltage source in a known way. The connection between the electrically conductive layers and the two carrier films, respectively, is made, for example, by means of current supply connectors which can be obtained by screen printing, in particular using silver, and this screen printing is then covered with an adhesive having electrical properties and an electrical foil called a "bus bar". Then, the electrical connection between the bus bars and the power supply is managed by appropriate wires or cables. The electrically conductive layers are preferably designed as transparent electrically conductive layers. The electrically conductive layers (6, 7) preferably contain at least one metal, one metal alloy or one transparent conductive oxide (TCO). The electrically conductive layers may contain, for example, silver, gold, copper, nickel, chromium, tungsten, indium tin oxide (ITO), gallium-doped or aluminum-doped zinc oxide, and/or fluorine-doped or antimony-doped tin oxide. The electrically conductive layers are preferably 10 nm to 2 μm thick, more preferably 20 nm to 1 μm, and even more preferably 30 nm to 500 nm. The thickness of the functional element is for example between 0.1 mm and 1 mm, and preferably between 0.2 mm and 0.5 mm.

The liquid crystal active layer (5) contains liquid crystals embedded in a polymer matrix. Moreover, the active layer has controllable optical properties because when no electric current is being applied (OFF state) to the two electrically conductive layers each with an electrode that surround the active liquid crystal layer, the liquid crystals are disorderedly oriented, resulting in strong scattering of light passing through the active layer. When an electric current is applied (ON state) to said electrically conductive layers, the liquid crystals align in the same direction, and the light transmission through the active layer is increased. Thus, when no electric current is applied, in the OFF state, the laminated glazing according to the invention is translucent, i.e. the light transmission of the laminated glazing according to the invention in the visible range is low. As soon as the current is switched on, in the ON state, the laminated glazing according to the invention is transparent since the liquid crystal layer changes to the transparent state under the action of the alternating electric field, it is then possible to see through the glass. The light transmission of the laminated glazing in the ON state in the visible range is then increased compared to the light transmission of the laminated glazing in the OFF state.

The functional element (4) comprises a liquid crystal active layer (5) between two electrically conductive layers (6, 7), themselves disposed between two carrier films (8, 9). Thus, the functional element comprises, in the order stated, at least one carrier film, an electrically conductive layer, a liquid crystal layer, another electrically conductive layer, and another carrier film. The carrier films in each case have an electrically conductive layer facing to an active liquid crystal layer. The carrier films are preferably made of a thermoplastic material such as polyethylene terephthalate (PET) or based thereon. The thickness of each carrier film is preferably between 50 μm and 400 μm and more preferably between 100 μm and 300 μm.

The inscription (10) can represent technical or non-technical information. Thus, the inscription or the decoration can be a design, a drawing, a brand, a label or a logo of a manufacturer, a word to designate a special series of vehicle, etc.

The size of the inscription may be at least 0.2 mm, preferably at least 0.4 mm. In a particular embodiment, the printed inscription (10) completely covers the outer surface of the exterior glass sheet (2). In another embodiment, the printed inscription partially covers the outer surface of said glass sheet. More particularly, the printed inscription covers from 10% to 90% of the total surface of the glass sheet (2), preferably from 20% to 50% and more preferably from 30% to 40%. The distance between an inscription and the edge of the glass sheet is advantageously at least 1.5 mm, preferably more than 2 mm. The inscription may comprise several characters. The distance between two characters is at least 0.5 mm, so that the two characters do not overlap and are well-separated after printing.

In a preferred embodiment, the inscription consisting of a semi-transparent reflective layer is printed on the exterior glass sheet (2) on the outer side (F1) by wet deposition according to a printing process such as screen printing, pad printing, or digital printing and preferably by screen printing.

The semi-transparent reflective layer forming the inscription advantageously consists essentially of one or more metal oxides.

The metal oxide can be selected from aluminum oxide, tin oxide, titanium oxide, copper oxide, chromium oxide, cobalt oxide, iron oxide manganese oxide, zirconium oxide, cerium oxide, yttrium oxide, silver oxide, gold oxide, platinum oxide and palladium oxide and a mixture thereof. Preferably, the semi-transparent reflective layer forming the inscription consists essentially of titanium oxide. The corresponding metal nitrates or chlorides or metal acetates, isopropanolates, acetylacetonates, salicylates or polyacrylates or mixtures thereof can be used as starting compounds for the metal oxides.

Advantageously, the semi-transparent reflective layer forming the printed inscription has a thickness of between 5 μm and 50 μm and preferably between 8 and 16 μm, in particular after the printing step by screen printing, pad printing, or by digital printing, preferably by screen printing.

The semi-transparent reflective layer according to the invention can be obtained from a sol-gel comprising a printable solution of the aforementioned metal oxides. In this particular case, the metal is mostly bound in a complex form and the sol-gel is specifically applied to the outer face (F1) of the exterior glass sheet (2) by wet deposition according to a printing process such as screen printing, for example, and then cured by heat treatment in air at a temperature between 500° C. and 700° C.

In addition, the sol-gel may include solvents and thickeners.

The solvents can be selected from alcohols, glycols, polypropylene glycols and their derivatives. Preferred solvents are alcohols such as ethanol, n-propanol, isopropanol, butanols and glycols such as di-, tri-, tetra-, penta- or hexamers of monoglycols, polypropylene glycols such as dipropylene glycol, tripropylene glycol and tetrapropylene glycol and their derivatives. The use of tripropylene glycol methyl ether is particularly preferred. Of course, two or more of these solvents or a mixture of them can also be used.

As a thickener, the sol-gel may comprise cellulose derivatives such as methyl or ethyl cellulose or polyacrylic acids. Thickeners are used to adjust the viscosity required for the sol-gel to print.

According to a preferred mode of the invention, the solvents and thickeners can also act as complexing agents for metals.

The sol-gel may contain additional additives common to all sol-gels.

Thus, the reflective semi-transparent layer forming the printed inscription according to the invention, being of an inorganic nature, has the advantage of being more resistant to UV, chemical and mechanical aggressions compared to decorative elements such as stickers, or glued-on or screwed-on plastic parts.

The invention also relates to a rear window, side window or roof window of a vehicle comprising a laminated glazing as described above.

Indeed, the laminated glazing according to the invention can be used as a rear window, side window or roof window of a motor vehicle.

The invention further relates to a method for manufacturing a laminated glazing for vehicle having electrically controllable optical properties comprising the following steps:

a) providing an interior glass sheet (1) and an exterior glass sheet (2), b) printing an inscription (10) consisting of a semi-transparent reflective layer on the outer face (F1) of the exterior glass sheet (2), c) curing said printed glass sheet by heat treatment in air at a temperature between 500° C. and 700° C., d) carrying out the forming of the two said glass sheets together or separately by heat treatment, e) separating the two formed glass sheets, f) arranging between the inner faces of the formed interior glass sheet (1) and the formed exterior glass sheet (2) provided with the printed inscription, an interlayer (3) comprising:

a first outer layer (3a) in a material selected from polyvinyl butyral (PVB), polyethylene vinyl acetate (EVA) and polyurethane (PU) and mixtures thereof, a functional element (4) comprising a liquid crystal active layer (5) between two electrically conductive layers (6, 7), themselves disposed between two carrier films (8, 9), and mixtures thereof a second outer layer (3a) in a material selected from polyvinyl butyral (PVB), polyethylene vinyl acetate (EVA) and polyurethane (PU) and mixtures thereof, g) assembling the two glass sheets (1,2) and the interlayer (3) by lamination to form a laminated glazing, and (e) degassing by autoclaving said laminated glazing.

In a preferred embodiment, the printing step b) is carried out by screen printing, pad printing, or digital printing, preferably by screen printing.

The step c) of curing the printed glass sheet by heat treatment in air makes it possible to give the region (or zone) of the laminated glazing (once obtained) provided with the layer forming the printed inscription a good level of external light reflection in the visible range (light reflected towards the outside environment, towards the outside of the vehicle).

Throughout the description of this application, vehicles with "electrically controllable optical properties" are defined as vehicles with laminated glazing comprising a functional element of liquid crystals dispersed in a polymer matrix (PDLC), as described above.

The following examples are purely illustrative and do not limit the scope of the present invention in any of the aspects described. All the laminated glazings in the examples have electrically controllable optical properties.

EXAMPLES

In these examples, a sol-gel of the Ferro Lustreflex Silver® type is deposited according to the decoration or inscription represented by the black zones of FIG. 2, by wet deposition according to a known screen 25 printing process on the edge of a glass sheet of the Planiclear® type (marketed by the applicant company). The inscription thus obtained consists of a semi-transparent reflective layer printed on a sheet of glass which will be arranged in the examples below on a laminated glazing comprising a PDLC functional element on the outer face of a vehicle.

As can be seen in FIG. 2, the printed inscription partially covers the surface of the exterior glass sheet since the printed inscription covers 40% of the total surface of the glass sheet.

A laminated glazing comprising a PDLC functional element of the following configuration I is prepared by successively arranging, starting from an interior glass sheet (glass sheet facing the interior of a vehicle) of the Lowe® type (marketed by the applicant company), the following elements:

a grey PVB layer with a thickness of 0.38 mm (corresponding to the first outer PVB layer), a PDLC functional element, a grey PVB layer with a thickness of 0.38 mm, a PET layer, a clear PVB layer with a thickness of 0.38 mm (corresponding to the second outer PVB layer), an exterior glass sheet (glass sheet facing the outside environment of a vehicle) of the Planiclear® type with a printed semi-transparent reflective inscription that is then cured by heat treatment in air.

Another PDLC laminated glazing comprising a PDLC functional element of the following configuration II is prepared by successively arranging, starting from an inner Lowe® type glass sheet, the following elements:

a clear PVB layer with a thickness of 0.38 mm (corresponding to the first outer PVB layer), a PDLC functional element, a grey PVB layer with a thickness of 0.38 mm, a PET layer, a clear PVB layer with a thickness of 0.38 mm (corresponding to the second outer PVB layer), an exterior glass sheet (glass sheet facing the outside environment of a vehicle) of the Planiclear® type with a printed semi-transparent reflective inscription that is then cured by heat treatment in air.

For each of the laminated glazing configurations I or II described above, the inscription consisting of a semi-transparent reflective layer is printed:

either on the outer face of the exterior glass sheet (face of the glass sheet facing the outside of the vehicle, commonly called "face 1" (F1)), as in the following examples: no. 1a (config. I+(F1)) and 2a (config. II+(F1)), according to the invention, or on the inner face of the exterior glass sheet (face of the glass sheet facing the interior of the vehicle, towards the outer layer of PVB, commonly called "face 2" (F2)), according to the following comparative examples: no. 1b (config. I+(F2)) and 2b (config. II+(F2)), and or no inscription is printed on the exterior glass sheet according to the following examples no. 1c (config. I) and 2c (config. II).

Then, an electric current is applied (ON state), or not (OFF state), to each of the laminated glazings (i.e. to each of the examples 1a, 1b, 1c and 2a, 2b, 2c, below), and the values of light transmissions LT and external light reflections $LR_{ext}$ are measured on the zone (or region) of the glazing provided with the semi-transparent reflective layer forming the printed inscription, as represented in FIG. 2, in the visible spectrum range (wavelengths between 380 nm and 780 nm), according to the methods described in the NF EN 410 (2011) standard. Indeed, FIG. 2 represents a laminated glazing for vehicles with electrically controllable optical properties provided with a printed inscription.

Measurements are performed using a Perkin Elmer UV/Vis/NIR spectrophotometer LAMBDA 900, with a transmission analysis spot size of 10 mm×16 mm and a reflection spot size of 4 mm×16 mm.

The LT is the light transmission indicating the radiant energy transmitted into the vehicle cabin in the optical range of a standard D65 illuminant. The angle of incidence of light on laminated glazing is 90°.

The $LR_{ext}$ corresponds to the external light reflection from the outside (light reflected to the outside environment, to the outside of a vehicle).

The results obtained are compiled in Tables 1 and 2 below:

Results

TABLE 1

| Configuration I | Face 1 1a ON | Face 1 1a OFF | Face 2 1b ON | Face 2 1b OFF | None 1c ON | None 1c OFF |
|---|---|---|---|---|---|---|
| LT | 1.49 | 0.97 | 1.8 | 1.17 | 1.82 | 1.27 |
| $LR_{ext}$ | 16.01 | 16.03 | 11.98 | 12 | 6.31 | 6.34 |

TABLE 2

| Configuration II | Face 1 2a ON | Face 1 2a OFF | Face 2 2b ON | Face 2 2b OFF | None 2c ON | None 2c OFF |
|---|---|---|---|---|---|---|
| LT | 3.44 | 3.45 | 5.52 | 3.85 | 5.99 | 4.1 |
| $LR_{ext}$ | 15.27 | 15.29 | 12.27 | 12.3 | 6.75 | 6.78 |

The results reported in these tables show that when the inscription consisting of a semi-transparent reflective layer is printed on the outer face, face 1, of the exterior glass sheet, according to the invention, regardless of the configuration (I or II) of a laminated glazing comprising a PDLC element (cf. examples 1a and 2a):

the light transmission of the glazing is maintained in the region where the printed inscription is located, whether in the ON or OFF state, since the value of the LT for a glazing according to the invention is of the same order of magnitude as the LT obtained for the same laminated glazing that does not comprise an inscription (cf. examples LT 1a ON and 2a ON according to the invention compared to examples LT 1c ON and 2c ON glazings without inscription respectively and examples LT 1a OFF and 2a OFF compared to examples LT 1c OFF and 2c OFF respectively), the external light reflection of the glazing is improved in the area where the printed inscription is located, whether in the ON or OFF state, since:

the value of the $LR_{ext}$ increases from 6.3% for a laminated glazing of configuration I without inscription/to 12% for the same laminated glazing with an inscription printed on face 2/to 16% for a laminated glazing according to the invention with the inscription printed on face 1, and the value of the $LR_{ext}$ increases from 6.8% for a laminated glazing of configuration II without inscription/to 12.3% for the same laminated glazing with an inscription printed on face 2/to 15.3% for a laminated glazing according to the invention with the inscription printed on face 1.

Indeed, it can be seen that the $LR_{ext}$ obtained for a laminated glazing comprising a PDLC element provided with an inscription printed on the outer face (face 1) of the exterior glass sheet, in accordance with the invention, is higher than the $LR_{ext}$ obtained for a laminated glazing comprising a PDLC element provided with an inscription printed on the inner face (face 2) of the exterior glass sheet, this shows the importance of the position of the inscription on a laminated glazing comprising a PDLC element (cf. examples $LR_{ext}$ 1a ON and 2a ON compared to Examples $LR_{ext}$ 1b ON and 2b ON respectively and Examples $LR_{ext}$ 1a OFF and 2a OFF compared to Examples $LR_{ext}$ 1b OFF and 2b OFF respectively).

The invention claimed is:

1. A laminated glazing for a vehicle provided with an inscription comprising an interior glass sheet and an exterior glass sheet, the exterior glass sheet comprising an outer face forming face F1 of the laminated glazing and an inner face forming face F2 of the laminated glazing, the interior glass sheet comprising an inner face forming face F3 of the laminated glazing and an outer face forming face F4 of the laminated glazing, and comprising, between the inner faces F3 and F2 of the interior and exterior glass sheets, an interlayer comprising at least two outer layers and in a material selected from polyvinyl butyral (PVB), polyethylene vinyl acetate (EVA) and polyurethane (PU) and mixtures thereof, said outer layers being joined by a functional element of liquid crystals dispersed in a polymer matrix, said functional element comprising a liquid crystal active layer between two electrically conductive layers, the two electrically conductive layers being disposed between two carrier films, wherein the inscription consists of a semi-transparent reflective layer and said inscription is printed on the exterior glass sheet on the outer face F1.

2. The laminated glazing according to claim 1, wherein the interior glass sheet and/or the exterior glass sheet comprises at least one coating.

3. The laminated glazing according to claim 1, wherein one of the two outer layers or each of the two outer layers has a thickness between 0.2 mm and 2.0 mm.

4. The laminated glazing according to claim 3, wherein the two outer layers are polyvinyl butyral (PVB) layers.

5. The laminated glazing according to claim 4, wherein one of the two outer PVB layers or each of the two outer PVB layers comprises at least one plasticizer.

6. The laminated glazing according to claim 3, wherein the thickness is between 0.3 mm and 0.9 mm.

7. The laminated glazing according to claim 1, wherein the two carrier films are made of polyethylene terephthalate (PET).

8. The laminated glazing according to claim 1, wherein a region of the laminated glazing provided with the semi-transparent reflective layer forming the inscription that is printed on the exterior glass sheet on the outer face has, in a wavelength range of the visible spectrum, a light transmission greater than 0% and an external light reflection between 10% and 30%.

9. The laminated glazing according to claim 8, wherein the light transmission is between 0.5% and 30% and the external light reflection is between 13% and 25%.

10. The laminated glazing according to claim 1, wherein the inscription is printed by screen printing, pad printing, or by digital printing.

11. The laminated glazing according to claim 10, wherein the inscription is printed by screen printing.

12. The laminated glazing according to claim 1, wherein a size of the inscription is at least 0.2 mm.

13. The laminated glazing according to claim 12, wherein the size of the inscription is at least 0.4 mm.

14. The laminated glazing according to claim 1, wherein the printed inscription covers from 10% to 90% of a total surface of the exterior glass sheet.

15. The laminated glazing according to claim 14, wherein the printed inscription covers from 20% to 50% of the total surface of the exterior glass sheet.

16. The laminated glazing according to claim 1, wherein the semi-transparent reflective layer forming the inscription consists essentially of one or more metal oxides.

17. The laminated glazing according to claim 16, wherein the one or more metal oxides are selected from aluminium oxide, tin oxide, titanium oxide, copper oxide, chromium oxide, cobalt oxide iron oxide, manganese oxide, zirconium oxide, cerium oxide, yttrium oxide, silver oxide, gold oxide, platinum oxide and palladium oxide and a mixture thereof.

18. A rear window, side window or roof window of a vehicle comprising a laminated glazing according to claim 1.

19. A method comprising providing a laminated glazing according to claim 1 as a rear window, side window or roof window of a motor vehicle.

20. A method for manufacturing a laminated glazing for vehicle having electrically controllable optical properties, the laminated glazing being provided with an inscription and comprising an interior glass sheet and an exterior glass sheet, the exterior glass sheet comprising an outer face forming face F1 of the laminated glazing and an inner face forming face F2 of the laminated glazing, the interior glass sheet comprising an inner face forming face F3 of the laminated glazing and an outer face forming face F4 of the laminated glazing, and comprising, between the inner faces F3 and F2 of the interior and exterior glass sheets, an interlayer comprising at least two outer layers and in a material selected from polyvinyl butyral (PVB), polyethylene vinyl acetate (EVA) and polyurethane (PU) and mixtures thereof, said outer layers being joined by a functional element of liquid crystals dispersed in a polymer matrix, said functional element comprising a liquid crystal active layer between two electrically conductive layers, the two electrically conductive layers being disposed between two carrier films, wherein the inscription consists of a semi-transparent reflective layer and said inscription is printed on the exterior glass sheet on the outer face F1, the method comprising:

a) providing the interior glass sheet and the exterior glass sheet, b) printing the inscription consisting of the semi-transparent reflective layer on the outer face F1 of the exterior glass sheet, c) curing said printed glass sheet by heat treatment in air at a temperature between 500° C. and 700° C., d) carrying out the forming of said interior and exterior glass sheets together or separately by heat treatment, e) separating the formed interior and exterior glass sheets, f) arranging between inner faces F3, F2 of the formed interior glass sheet and the formed exterior glass sheet provided with the printed inscription, the interlayer comprising:

a first outer layer of the at least two outer layers in the material selected from polyvinyl butyral (PVB), polyethylene vinyl acetate (EVA) and polyurethane (PU) and mixtures thereof, the functional element comprising the liquid crystal active layer between two electrically conductive layers, the two electrically conductive layers being disposed between two carrier films, and a second outer layer of the at least two outer layers in the material selected from polyvinyl butyral (PVB), polyethylene vinyl acetate (EVA) and polyurethane (PU) and mixtures thereof, g) assembling the interior and exterior glass sheets and the interlayer by lamination to form a laminated glazing, and h) degassing by autoclaving said laminated glazing.

* * * * *